US006473955B1

(12) United States Patent
Huang

(10) Patent No.: US 6,473,955 B1
(45) Date of Patent: Nov. 5, 2002

(54) PULLING GUN FOR DEPLOYING EXPANDING ANCHORS

(75) Inventor: Pan-Ching Huang, Changhua (TW)

(73) Assignee: Joker Industrial Co., Ltd., Changhua (TW)

( * ) Notice: Subject to any disclaimer, the term of this patent is extended or adjusted under 35 U.S.C. 154(b) by 0 days.

(21) Appl. No.: 09/983,328

(22) Filed: Oct. 24, 2001

(51) Int. Cl.$^{7}$ .................................................. B23P 19/04

(52) U.S. Cl. ............................. 29/268; 29/270; 29/280; 29/282; 269/6

(58) Field of Search .......................... 29/268, 267, 278, 29/280, 283, 283.5, 270; 269/6, 3

(56) References Cited

U.S. PATENT DOCUMENTS 2,339,397 A * 1/1944 Helbush ...................... 29/268
4,602,418 A * 7/1986 Bone et al. ................ 29/566.1
4,932,638 A * 6/1990 Chen ............................. 269/6
6,108,885 A * 8/2000 Cox ............................ 29/268

* cited by examiner

*Primary Examiner*—Lee Wilson
(74) *Attorney, Agent, or Firm*—Rosenberg, Klein & Lee

(57) ABSTRACT

An improved pulling gun to provide a parallel and linear pulling force for pulling out screws of various sizes from bulged screw cartridges smoothly without reduced defects. The pulling gun includes a lever and a handle having respectively an upper section pivotally engaged with each other and a lower section bifurcated at a front and a rear position by a pivotal spring located in the handle. The lever has an upper pin mounted to the top end to pivotally engage with a guide sleeve which has two side walls formed respectively an upper flange and a lower flange bent inwards from the top and bottom ends thereof. The upper section of the handle engages with a pulling sleeve which has two side walls each having a guide slot in parallel with each other to allow the upper pin of the lever moving therein. The pulling sleeve is movable in the guide sleeve linearly and in parallel to generate a linear and parallel pulling force to remove screws without wobbling or generating defects.

2 Claims, 5 Drawing Sheets

PULLING GUN FOR DEPLOYING EXPANDING ANCHORS

BACKGROUND OF THE INVENTION

1. Field of the Invention

The invention relates to an improved pulling gun and particularly a pulling gun that provides a parallel and linear pulling force for pulling out screws of various sizes from bulged screw cartridges smoothly with reduced defects.

2. Description of the Prior Art

Conventional pulling guns such as the one shown in FIG. 1 generally include a handle 70 and a lever 80 coupling at the upper sections and bifurcated at the lower sections in a front and a rear manner. There is a tension spring 50 pivotally engaged with a pivotal pin 73 anchored on two walls of the handle 70 with two extended legs 51 to keep the lower section of the lever 80 spaced from the lower section of the handle 70 at normal conditions. There is a cylindrical guiding sleeve 71 mounted to the upper section of the handle 70. There is also a cylindrical pulling sleeve 81 of a smaller diameter mounted to the upper section of the lever 80 and coupled with and housed in the guiding sleeve 71. The sleeves 71 and 81 have respectively a notch 711 and 811 formed at the front ends. The lever 80 further has two guide slots 82 formed on two walls to couple respectively with a support pin 72.

Referring to FIG. 2, when not in use at the normal conditions, the lower sections of the handle 70 and lever 80 are bifurcated and spaced from each other, and the front ends of the sleeves 71 and 81 are contacted. As shown in FIG. 3, the notches 711 and 811 of the sleeves 71 and 81 have an upward opening which may be wedged on the neck section under the head of a screw 62 located in a bulged screw cartridge 60 with the front end of the guiding sleeve 71 depressing against the outer rim of the screw seat 61. When the lever 80 is depressed against the handle 70, the upper section of the lever 80 will move the pulling sleeve 81 rearwards to pull the head of the screw 62 and remove the screw 62.

As the lever 80 is pivotally engaged with the handle 70 on a single pivotal joint, when the lever 80 is moved towards the handle 70 about the pin 73 as a fulcrum, the upper ends of the handle 70 and lever 80 will be moved away in opposite directions, and the pulling sleeve 81 of the lever 80 will pull the screw 60 rearwards. The top end of the handle 70 will be rocked along a curve (shown by broken lines in FIG. 2). As a result, the guiding sleeve 71 will be moved in a skewed direction and biased from the accurate anchor position. The movement of pulling the screw will be skewed and becomes not effective.

Moreover, the notches 711 and 811 of the sleeves 71 and 81 usually are formed in a fixed size of a semicircular shape. Thus one set of pulling gun can fit and be used for the bulged screw cartridge 60 of one specification. Its applicability is severely limited.

SUMMARY OF THE INVENTION

In view of aforesaid disadvantages, it is a primary object of the invention to provide an improved pulling gun that provides a parallel and linear pulling movement between the guiding sleeve and pulling sleeve so that a parallel and linear pulling force will be generated to pull out the screw without wobbling to reduce defected operations.

Another object of the invention is to provide an improved pulling gun that have V-shaped notches formed on the front walls of the guiding sleeve and pulling sleeve for pulling out screws of various sizes from bulged screw cartridges effectively and conveniently.

To achieve the objects set forth above, the invention has a lever pivotally engaged with a handle at an upper section and formed bifurcated lower sections in a front and a rear manner. The lever has an upper section pivotally engaged with two side walls of a guiding sleeve through an upper pin. The two side walls of the guiding sleeve have respectively an upper flange and a lower flange bent inwards on the top and bottom edges. The handle has an upper section with two side walls thereof formed jutting ledges to fasten with a pulling sleeve through three pins. The three pins include an outer pin to pivotally engage with the lever and an inner pin to anchor a tension spring which has two extended legs to push the inner sides of the lower sections of the handle and lever to make them spaced apart at normal conditions. The pulling sleeve is coupled with the interior of the guide sleeve and has two side walls each having a guide slot in parallel with each other. The upper pin passes through the guide slot for guiding the pulling sleeve moving in parallel and linearly between the upper and lower flanges of the guide sleeve. The guide sleeve and pulling sleeve have respectively a front wall which have a notch formed thereon. Then notch has a wider top end and a narrower bottom end to engage with screw heads of various sizes in the bulged screw cartridges. The pulling gun thus made can provide a parallel and linear pulling force to remove the screws without wobbling or resulting defected operations.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
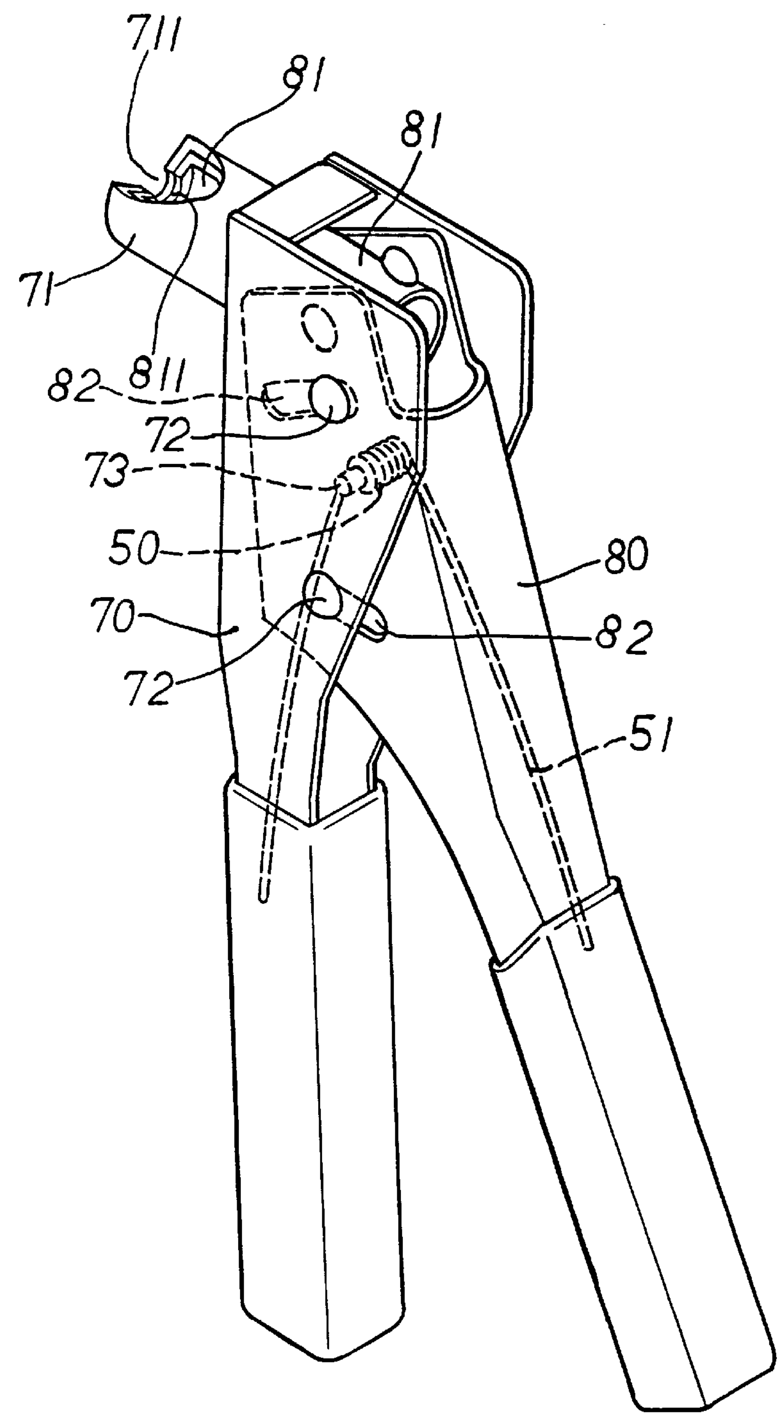
FIG. 1 PRIOR ART
FIG. 1 is a perspective view of a conventional pulling gun.
Figure 2:
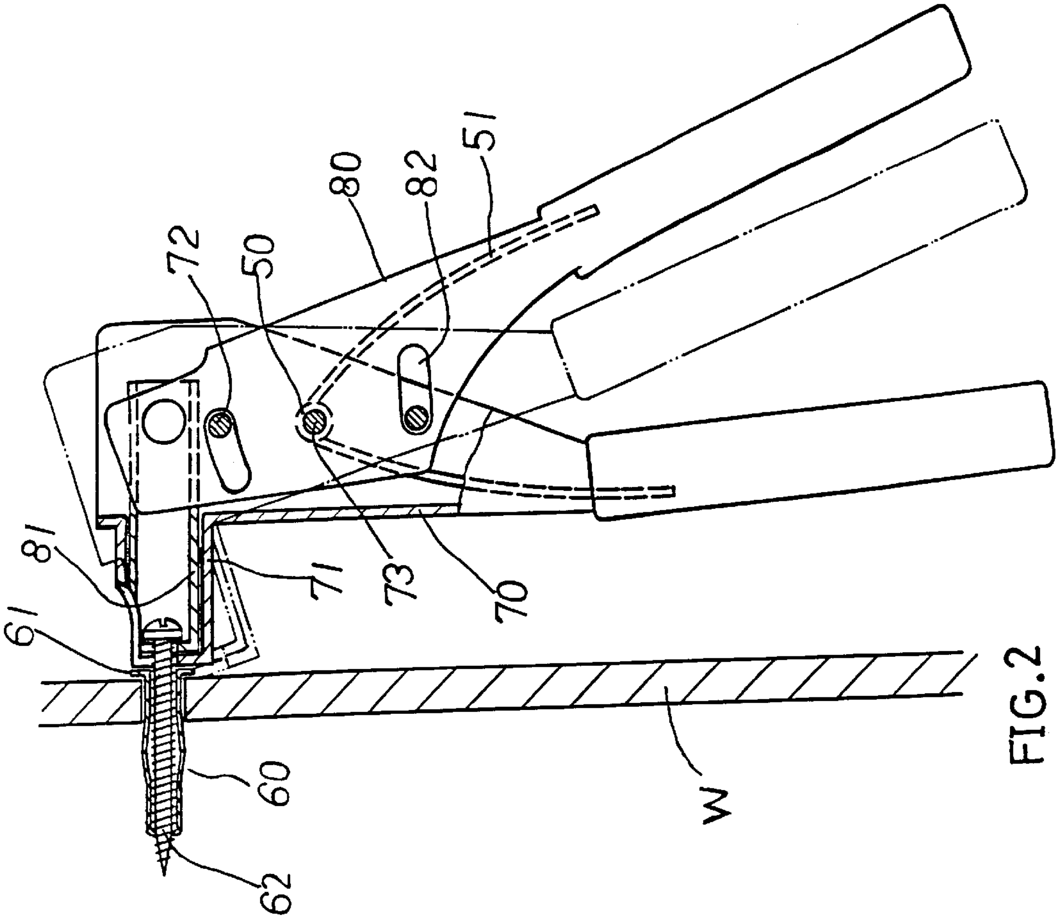
FIG.2 PRIOR ART
FIG. 2 is a side view of a conventional pulling gun in use.
Figure 3:
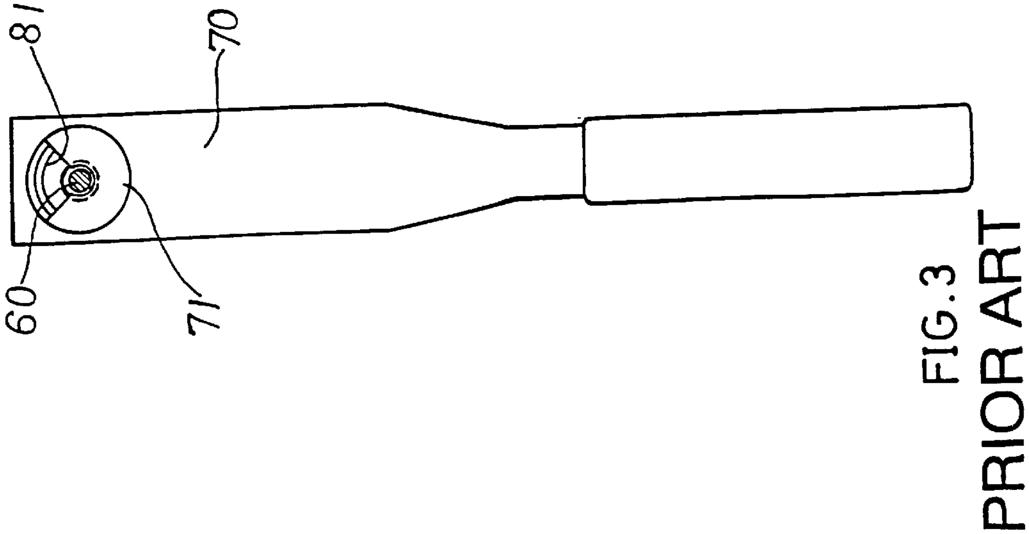
FIG.3 PRIOR ART
FIG. 3 is a front view of a conventional pulling gun in use.
Figure 4:
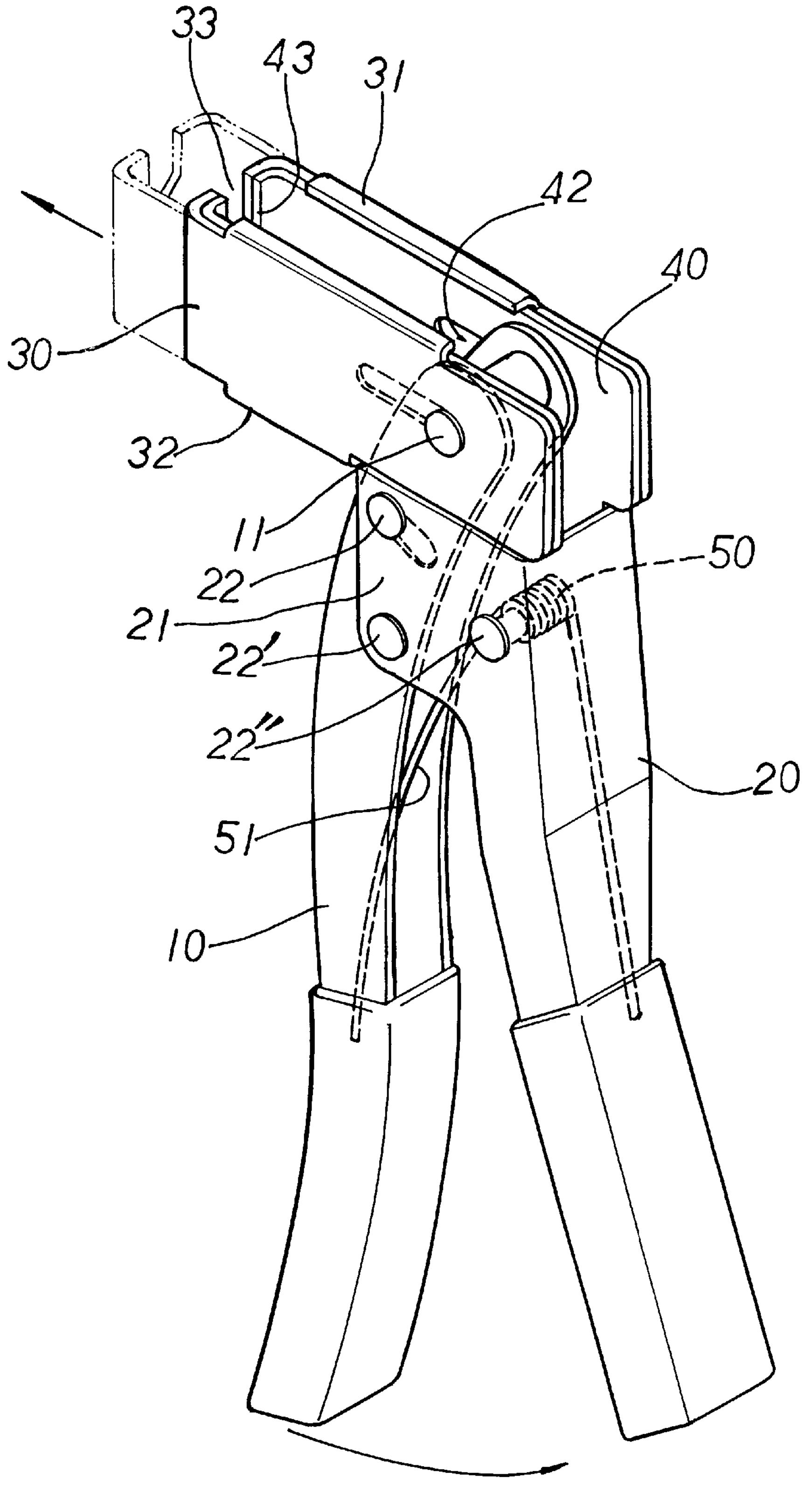
FIG. 4 is a perspective view of the invention.
Figure 5:
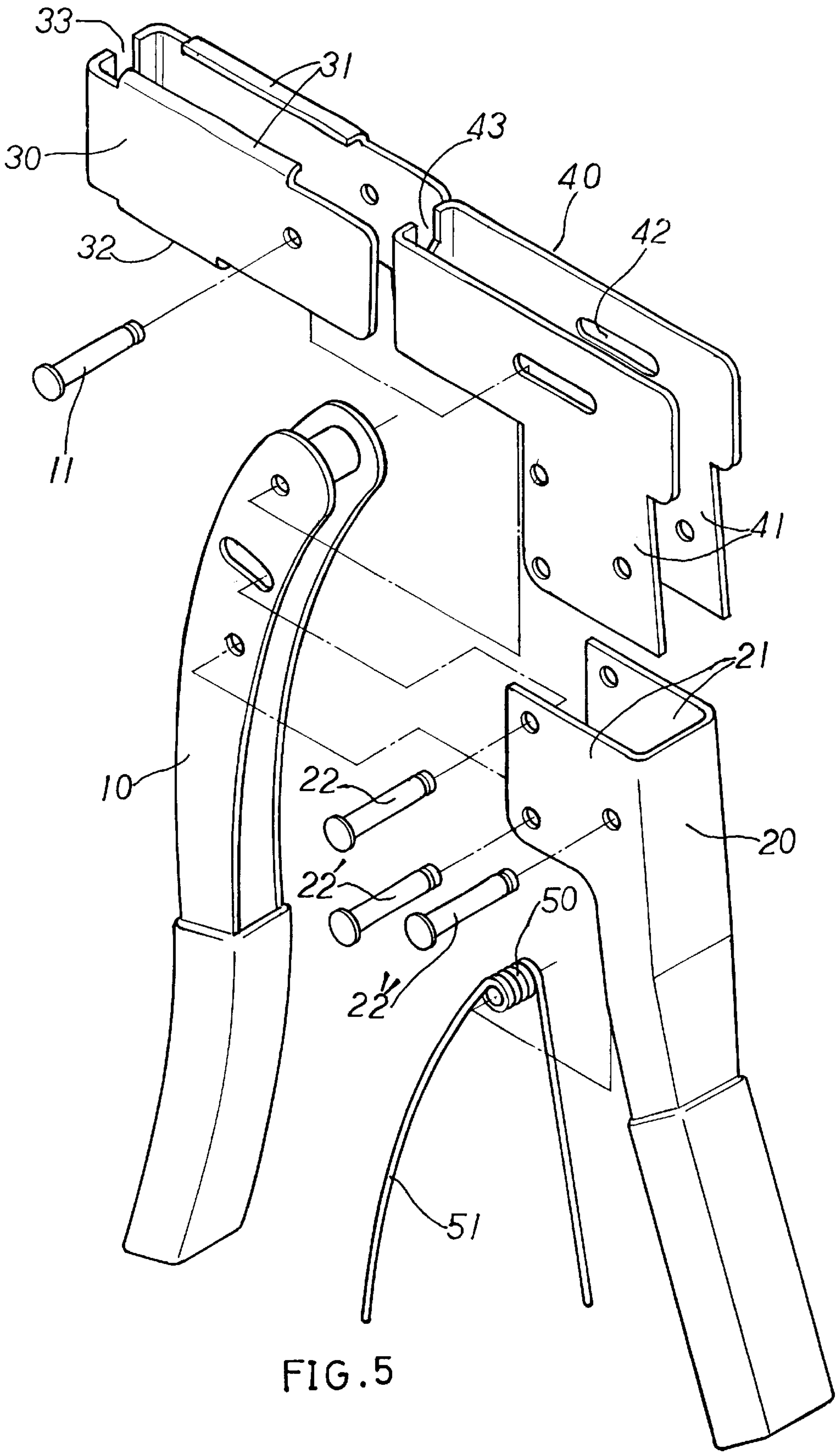
FIG. 5 is an exploded view of the invention.

Referring to FIG. 4, the invention mainly includes a lever 10 and a handle 20 which have respectively an upper section pivotally engaged with each other and a lower section bifurcated at a front and a rear position. The lever 10 has an upper pin 11 mounted to the top end to pivotally engage with a guide sleeve 30. The guide sleeve 30 has two side walls which have respectively an upper flange 31 and a lower flange 32 bent inwards from the top and bottom ends thereof. The handle 20 has an upper section with two side walls thereof forming jutting ledges 21 to fasten with two lower plates 41 of a pulling sleeve 40 through three pins 22, 22' and 22". The three pins include an outer pin 22' to pivotally engage with the lever 10 and an inner pin 22" to anchor a tension spring 50 which has two extended legs 51 to push the inner walls of the lower sections of the handle 20 and lever 10 apart at normal conditions. The pulling sleeve 40 is coupled with the interior of the guide sleeve 30 and has two side walls each having a guide slot 42 in parallel with each other. The upper pin 11 of the guide sleeve 30 passes through the guide slot 42. The guide sleeve 30 and pulling sleeve 40 have respectively a front end which has a V-shaped notch 33 and 43 formed thereon. The notches 33 and 43 have a wider top end and a narrower bottom end (as shown in FIGS. 4 and 7).

Figure 6:
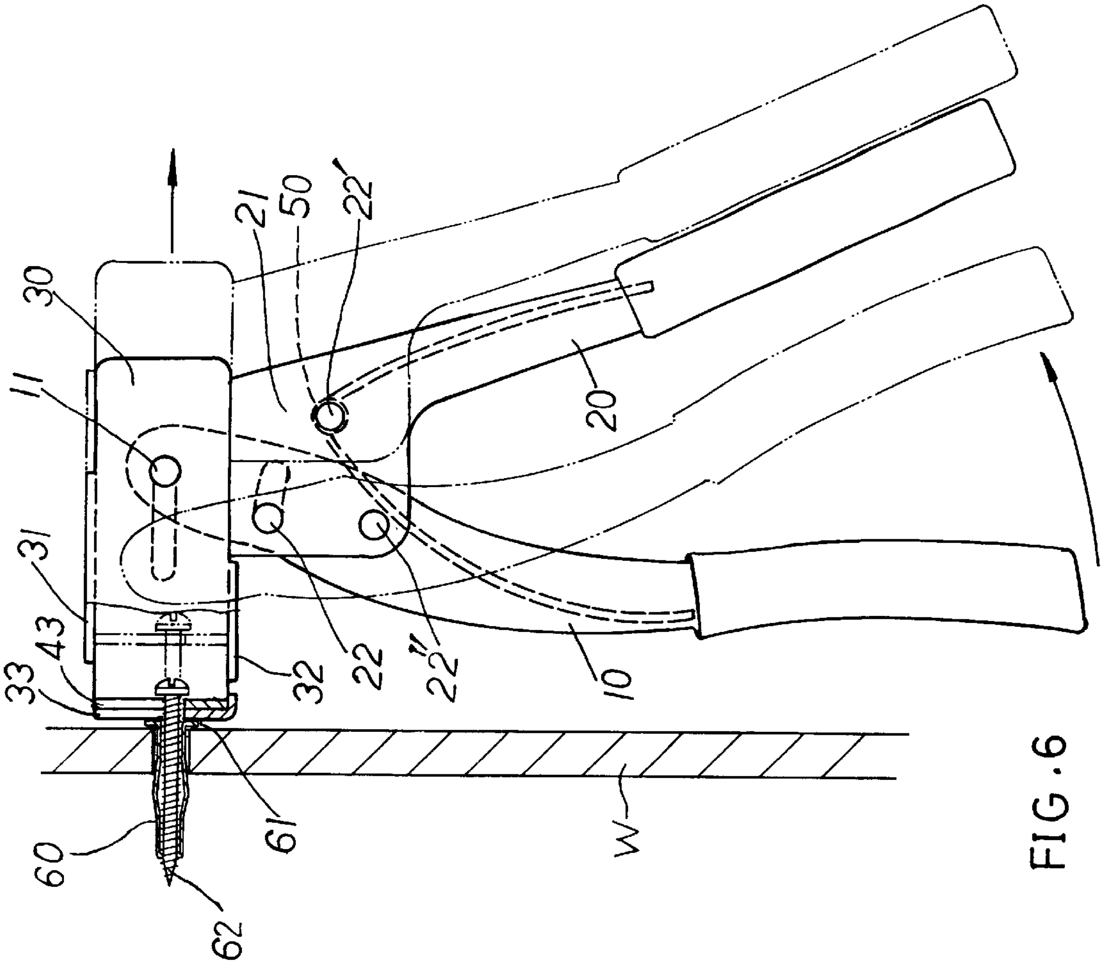
FIG. 6 is a side view of the invention in use.

Referring to FIG. 6, the upper flange 31 and lower flange 32 of the guide sleeve 30 guide the pulling sleeve 40 moving in parallel in the guide sleeve 30, and the parallel guide slots 42 on the pulling sleeve 40 allow the pulling sleeve 40 moving linearly through the upper pin 11 of the guide sleeve 30.

Figure 7:
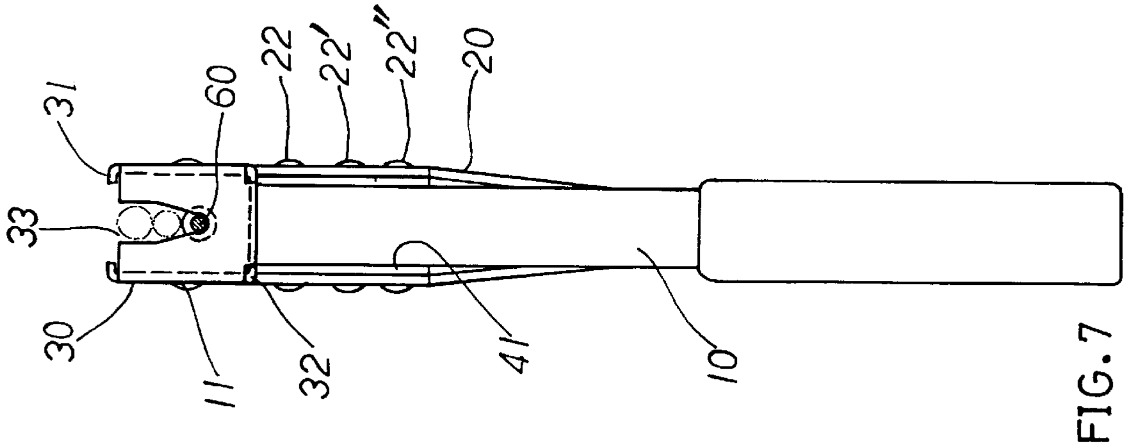
FIG. 7 is a front view of the invention in use.

Referring to FIG. 7, when in use, the front walls of the guide sleeve 30 and pulling sleeve 40 are contacted to each other, and the notches 33 and 43 may be wedged on the neck section of the head of a screw 62 located in a bulged screw cartridge 60. Then grasp handle 20 and lever 10 and move them towards each other as shown by the arrow in FIG. 6, the upper pin 11 originally located at the rear end of the guide slot 42 will be moved forwards and drives the guide sleeve 30 forwards, and the pulling sleeve 40 will be moved rewards relative to the guide sleeve 30 as shown by the arrow in FIG. 4. As shown in FIG. 7, the front wall of the guide sleeve 30 is anchored on the screw seat 61 of the bulged screw cartridge 60, hence the pulling sleeve 40 will be moved rearwards relative to the inner pin 22' which serves as a fulcrum shown by broken lines in FIG. 6. The notch 43 thus can pull the head of the screw 62 rearwards from the bulged screw cartridge 60 to a position shown by the broken line to complete screw removing operation.

Referring to FIG. 7, the notches 33 and 43 of the guide sleeve 30 and pulling sleeve 40 is tapered from the top end to the bottom end, thus can be used to engage and remove different sizes of the screw 62 and bulged screw cartridge 60. The parallel and linear movement of the invention can also produce a parallel and linear pulling force during operation to prevent wobbling and reduce defected operation.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A pulling gun for deploying expanding anchors, comprising:

a lever having an upper pin mounted to a top end thereof to pivotally engage with a guide sleeve and a first upper section and a first lower section, the guide sleeve having two side walls each having an upper flange and a lower flange bending inwards from the top end and the bottom end thereof, and a first front wall having a first notch with an opening facing upward; and a handle having a second upper section pivotally engaged with the first upper section of the lever and a second lower section which is pivotally engaged with a spring which in turn pushes the first lower section and the second lower section apart and bifurcated at a front position and a rear position, the second upper section being engaged with a pulling sleeve which is coupled with the interior of the guide sleeve, the pulling sleeve having two side walls which have respectively a slot in parallel with each other, the upper pin of the lever being movable in the slots, the pulling sleeve further having a second front wall which has a second notch formed thereon matching and contactable with the first notch;

wherein the pulling sleeve is movable linearly and in parallel in the guide sleeve through bordering of the upper flange and the lower flange and channeling of the parallel slots about the upper pin anchored on the guide sleeve to generate a linear and parallel pulling force.

2. The pulling gun for deploying expanding anchors of claim 1, wherein the first notch and second notch are respectively formed in V-shaped tapering from the top to bottom thereof.

* * * * *